United States Patent [19]
Farmer et al.

[11] Patent Number: 6,085,151
[45] Date of Patent: Jul. 4, 2000

[54] PREDICTIVE COLLISION SENSING SYSTEM

[75] Inventors: Michael E. Farmer, West Bloomfield; Michael P. Bruce, Brighton, both of Mich.

[73] Assignee: Automotive Systems Laboratory, Inc., Farmington Hills, Mich.

[21] Appl. No.: 09/009,035

[22] Filed: Jan. 20, 1998

Related U.S. Application Data

[60] Provisional application No. 60/035,667, Jan. 21, 1997, and provisional application No. 60/044,237, Apr. 24, 1997.

[51] Int. Cl.[7] .................................................... G01S 13/93
[52] U.S. Cl. ............................... 701/301; 701/96; 342/70
[58] Field of Search ..................................... 701/300, 301, 701/96; 340/903, 943, 435, 436; 280/734, 735; 356/3; 367/87, 90, 99, 103; 342/118, 70, 71, 72

[56] References Cited

U.S. PATENT DOCUMENTS

| | | | |
|---|---|---|---|
| 3,684,309 | 8/1972 | Uchiyamada et al. | 280/150 AB |
| 3,687,213 | 8/1972 | Sato et al. | 180/82 |
| 3,703,702 | 11/1972 | Arai | 340/52 R |
| 3,710,387 | 1/1973 | Hinchman et al. | 343/12 R |
| 3,725,918 | 4/1973 | Fleischer et al. | 343/5 EM |
| 3,735,398 | 5/1973 | Ross | 343/7 ED |
| 3,741,584 | 6/1973 | Arai | 280/150 AB |
| 3,971,018 | 7/1976 | Isbister et al. | 343/5 CD |
| 4,168,499 | 9/1979 | Matsumura et al. | 343/7 VM |
| 4,537,271 | 8/1985 | Ito et al. | 186/131 |
| 4,623,966 | 11/1986 | O'Sullivan | 364/461 |
| 4,673,937 | 6/1987 | Davis | 342/72 |
| 4,839,655 | 6/1989 | Kiuchi | 342/93 |
| 4,926,171 | 5/1990 | Kelley | 340/961 |
| 5,008,678 | 4/1991 | Herman | 342/158 |
| 5,122,796 | 6/1992 | Beggs et al. | 340/904 |
| 5,264,859 | 11/1993 | Lee et al. | 343/754 |
| 5,268,692 | 12/1993 | Grosch et al. | 342/70 |
| 5,280,288 | 1/1994 | Sherry et al. | 342/83 |
| 5,291,207 | 3/1994 | Kikuchi et al. | 342/70 |
| 5,302,956 | 4/1994 | Asbury et al. | 342/70 |
| 5,313,212 | 5/1994 | Ruzicka | 342/101 |
| 5,314,037 | 5/1994 | Shaw et al. | 180/169 |
| 5,355,118 | 10/1994 | Fukuhara | 340/435 |
| 5,357,438 | 10/1994 | Davidian | 364/461 |
| 5,361,070 | 11/1994 | McEwan | 342/21 |
| 5,369,590 | 11/1994 | Karasudani | 364/460 |
| 5,402,129 | 3/1995 | Gellner et al. | 342/70 |
| 5,467,072 | 11/1995 | Michael | 340/436 |
| 5,471,214 | 11/1995 | Faibish et al. | 342/70 |
| 5,473,538 | 12/1995 | Fujita et al. | 364/424.05 |
| 5,517,197 | 5/1996 | Algeo et al. | 342/70 |
| 5,530,651 | 6/1996 | Uemura et al. | 701/301 |
| 5,629,669 | 5/1997 | Asano et al. | 340/436 |
| 5,633,642 | 5/1997 | Hoss et al. | 342/70 |
| 5,684,473 | 11/1997 | Hibino et al. | 340/903 |
| 5,689,264 | 11/1997 | Ishikawa et al. | 342/70 |
| 5,691,725 | 11/1997 | Tanaka | 342/126 |

OTHER PUBLICATIONS

Multiple Target Tracking with Radar Applications, Artech House, 1986, pp. 83–105.

"New Ideas in FM Radar", Electronics & Communications Engineering Journal, Oct. 1990, pp. 185–194.

"Linear FMCW radar techniques", IEEE Proceedings–F. vol. 139. No. 5 Oct. 1992, pp. 343–350.

*Primary Examiner*—Tan Nguyen
*Attorney, Agent, or Firm*—Lyon, P.C.

[57] ABSTRACT

A relatively narrow beam of either RF or optical electromagnetic radiation is scanned over a relatively wide azimuthal range. The return signal is processed to detect the range and velocity of each point of reflection. Individual targets are identified by clustering analysis and are tracked in a Cartesian coordinate system using a Kalman filter. The threat to the vehicle for a given target is assessed from estimates of the relative distance, velocity, and size of each target, and one or more vehicular devices are controlled responsive to the assessment of threat so as to enhance the safety of the vehicle occupant. In a preferred embodiment, a quantized linear frequency modulated continuous wave RF signal is transmitted from and received by a multi-beam antenna having an aziumthal range of at least +/–100 degrees and an individual beam width of approximately 10 degrees.

30 Claims, 7 Drawing Sheets

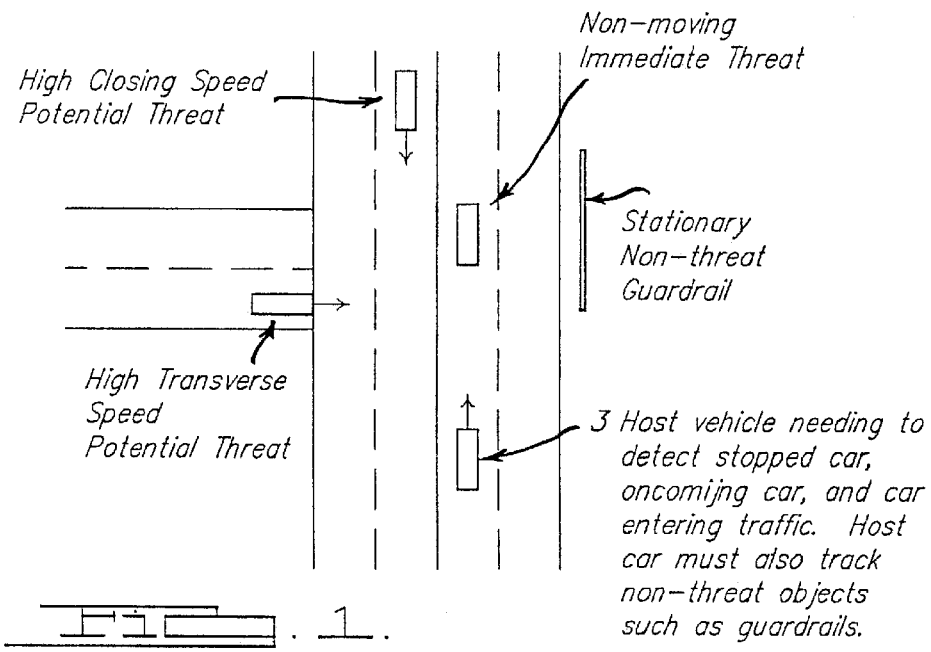
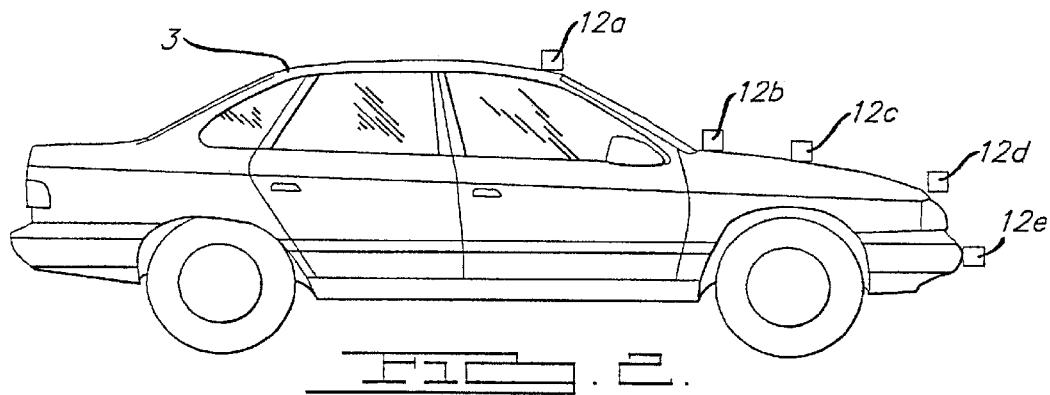
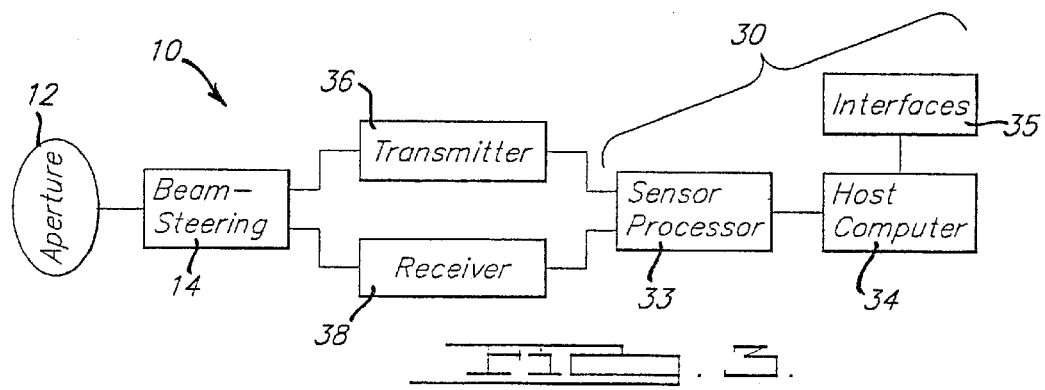

PREDICTIVE COLLISION SENSING SYSTEM

CROSS-REFERENCE TO RELATED APPLICATIONS

The instant application claims the benefit of prior U.S. Provisional Application Serial Ser. No. 60/035,667 filed on Jan. 21, 1997.

The instant application also claims the benefit of prior U.S. Provisional Application Ser. No. 60/044,237 filed on Apr. 24, 1997.

U.S. application Ser. No. 09/007,992, now U.S. Pat. No. 5,923,280, entitled "Vehicle Collision Radar With Randomized FSK Waveform", filed on Jan. 16, 1998 claiming benefit of U.S. Provisional Application Ser. No. 60/035,453 filed on Jan. 17, 1997, and assigned to the assignee of the instant invention, discloses a system and method for improving sensor reliability and robustness for automotive collision prediction with a randomized frequency shifting sequence for generating a linear Frequency Modulation (LFM) equivalent signal for continuous wave (CW) radar ranging.

U.S. application Ser. No. 09/173,322, now U.S. Pat. No. 5,969,667, entitled "Radar System", filed on Oct. 15, 1998, claiming benefit of U.S. Provisional Application Ser. No. 60/066,025, entitled "Automotive Radar", filed on Oct. 16, 1997; and claiming benefit of U.S. Provisional Application Ser. No. 60/071,964, entitled "Digital Leakage Calibration for Multi-beam Aperture Continuous Wave Radar", filed on Jan. 20, 1998, all assigned to the assignee of the instant invention, discloses a system and method for removing the leakage signal component from a continuous wave radar.

The above identified applications are incorporated herein by reference.

TECHNICAL ART

The instant invention generally relates to radar systems and more particularly to automotive radar systems incorporated in vehicle collision avoidance and in vehicle safety restraint systems.

BACKGROUND OF THE INVENTION

A vehicle may contain automatic safety restraint actuators that are activated responsive to a vehicle crash for purposes of mitigating occupant injury. Examples of such automatic safety restraint actuators include air bags, seat belt pretensioners, and deployable knee bolsters. One objective of an automatic restraint system is to mitigate occupant injury, thereby not causing more injury with the automatic restraint system than would be caused by the crash had the automatic restraint system not been activated. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

Known deployment systems for vehicle safety devices such as an air bag require the host vehicle to actually collide with an obstacle or other vehicle before the deployment decision process begins. At that point in time, the sensors detect a deceleration in the host vehicle and deploy one or more safety systems. Thus, the crash is identified based solely on the characteristic of the acceleration versus time measure. The disadvantage with existing post-crash detection systems derives from the fact that the time available to deploy an active safety device is very short, particularly for side impact or high speed frontal collisions where occupant restraint systems can provide significant safety benefits. These short time frames lead to rates of inflation of the airbags that are so great that injury or death are possible if the occupant is not well aligned with the airbag.

One technique for mitigating injury by the air bag inflator to occupants is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants at greater risk for injury when exposed to higher severity crashes.

Another technique for mitigating injury by the air bag inflator to occupants is to control the rate of inflation rate or the capacity of the inflator responsive to a measure of the severity of the crash. The prior art teaches the use of multi-stage inflators having distinct independent compartmentalized stages and corresponding firing circuits, whereby the stages may be fired in delayed succession to control the effective inflation rate, or stages may be inhibited from firing to control the effective inflator capacity. The prior art also teaches the use of a hybrid inflator having a combination of stored gas and plural pyrotechnic gas generator elements which are independently fired. Furthermore, the prior art also teaches the use of control valves for controlling the gaseous discharge flow from the inflator. The inflation rate and capacity may be controlled responsive to the sensed or estimated severity of the crash, whereby a low severity would require a lower inflation rate or inflation capacity than a high severity crash. Since lower severity crashes are more likely than those of higher severity, and since such a controlled inflator would likely be less aggressive under lower severity crash conditions than those of higher severity, occupants at risk of injury by the air bag inflator because of their size or position will be less likely to be injured overall because they are more likely to be exposed to a less aggressive inflator. However, the risk of injury to such occupants would not be mitigated under the conditions of higher crash severity when the inflator is intentionally made aggressive in order to provide sufficient restraint for normally positioned occupants.

Ideally, the air bag would be inflated prior to any interaction with a normally seated occupant, and at a rate which is sufficiently slow that an out of position occupant would not be injured by the inflating air bag. For a crash of sufficient severity, this requires the crash sensing system to be able to predict immanent crashes because the time required to inflate the bag at an inflation rate that is sufficiently slow to be safe for out-of-position occupants may be greater than either that required for the occupant to move so as to commence interaction with an inflated air bag or to safely decelerate the occupant.

Current sensing technology uses accelerometers to detect the occurrence of the actual crash and therefore make it impossible to activate the safety devices prior to the crash. Radar sensors are currently being investigated for intelligent cruise control applications that merely provide a convenience to the operator of the vehicle in terms of maintaining a safe distance from other vehicles and slow the host vehicle by braking or throttling the engine. Failure of such a system will only inconvenience the driver and force them to maintain their own distance. Collision prediction sensors, however, must operate with 100 percent effectiveness since the passenger safety is at risk. In light of this the system must operate in a reliable and robust manner under all imaginable operating conditions and traffic scenarios.

Radar sensors are also currently being investigated for collision avoidance, where the host vehicle is radically slowed or steered away from the collision. However, these systems are not integrated into the deployment decision process of the safety restraint systems.

The disadvantage with existing post-crash detection systems derives from the fact that the time available to deploy an active safety device is very short, particularly for side impact or high speed frontal collisions where occupant restraint systems can provide significant safety benefits. These short time frames lead to rates of inflation of the airbags that are so great that injury or death are possible if the occupant is not well aligned with the airbag.

The disadvantage of proposed intelligent cruise control systems is that the field of view is only a few lane widths ahead of the vehicle (10–12 degrees maximum). These systems are thus incapable of detecting off-angle frontal or side impact crashes.

The disadvantage of the collision avoidance systems is that the control of the vehicle is taken from the driver to actively steer the vehicle to safety. This requires significant intelligence to detect a safe course of travel, which in turn increases the time needed for processing, and the overall cost of the system. Additionally, most collision avoidance systems only address the situation where the host vehicle is moving and will collide with another object. The issue of a stationary host and a target vehicle that is moving and responsible for the collision is not properly addressed.

For measuring objects closely spaced in angle, all systems have been relying on very narrow radar beamwidths that add further cost to the system, and can make the antenna undesirably large and difficult to install on a vehicle.

Generally, known automotive radar systems use range information to a target, and then estimate target speed using sequential range measurements to determine the change in distance over time. Such automotive radar systems use either a dual frequency ranging method, or continuous linear frequency modulated (FM) signals. The dual frequency method uses two tones to derive range from the relative phase between the two signals. The linear FM approach uses a continuously swept ramped waveform of increasing frequency with time. This is then repeated over and over.

The dual frequency method is useful for a single target within the radar beam for estimating the range. However, in a predictive collision sensing application, a radar needs to track multiple targets at varying ranges within a field of interest because each such target is a potential collision. For multiple targets, multiple ramps would be required, thereby creating the need for a very complicated radar system that can detect the various ramps and their resultant signals.

SUMMARY OF THE INVENTION

Therefore, an object of the instant invention is to provide a system that can sense objects that may collide with the host vehicle prior to the actual impact. The instant invention estimates the time to impact of the colliding object, identifies the type and estimates the severity of the crash for controlling one or more of the following vehicular devices so as to enhance the safety of the occupant of the vehicle: a) warning devices to alert the driver of impending danger from a potential crash, b) the vehicle braking and/or steering system for automatically avoiding a potential crash if possible, and c) occupant restraint devices such as energy absorbing seat belt tensioners and variable rate air bag inflators. As described more fully hereinbelow, the instant invention provides a predictive collision sensing and deployment control system with the following features:

1. Scans through a large angular region (e.g., >±100 degrees) about a host vehicle velocity vector.
2. Tracks multiple (e.g., >25) objects simultaneously to ensure all potentially threatening objects are accounted for.
3. Projects the tracks forward in time to derive probability of impact, time to impact, severity of impact, and point/angle of impact for deploying the active safety system.
4. Treats every sensor report as a possible colliding object and performs threat assessment analysis thereon to determine if a given sensor report was a false alarm, thereby greatly reducing the likelihood of missing a collision.
5. Requires no data regarding the host vehicle speed, heading, location, etc. and also needs no data on the state of the roadway, (e.g., curving, straight), and no knowledge of the location of the host vehicle within the roadway to further prevent missing possible colliding objects, thereby increasing the reliability of the system during skids or slides when the vehicle is out of control.
6. Is immune to interference from other similar systems in the area due to unique signal encoding.
7. Is used to deploy and control the method and mix of deployment of vehicle control and occupant restraint systems such as a combination of seat belt pretensioners, airbags, brakes, as well as external damage mitigation systems such as external airbags. Is also used to warn the operator of impending crash for operator based avoidance (i.e. steering or additional braking).
8. Adaptively scans or points the antenna to increase the rate of updates from information rich locations in the event of a possible high threat target to improve the estimate of the collision time and severity.
9. Detects if the host vehicle will collide with another either moving or stationary object or if another vehicle will collide with the host vehicle, even if the host vehicle is stationary, over a wide range of approach angles.

One object of the instant invention is to provide an automotive predictive collision sensing radar which detects objects closely spaced in angle without a narrow radar beamwidth, resolves stationary and moving objects that are at the same range (i.e. automobiles and bridge abutments), and provides improved performance against volumetric clutter.

A further object of the instant invention is to provide an automotive predictive collision sensing system having improved signal-to-noise ratio for enhanced target detection, and reduced transmit power of the radar for densely populated areas.

In accordance with the instant invention, a range-Doppler image is used not only to generate the speed of all targets instantaneously, but also to provide sub-antenna beam resolvability of multiple targets in the radar beam. This allows the system of the instant invention to use a broader beam and cover an entire search volume around the car more quickly. It also reduces the complexity of the radar system in terms of the number of beams that would be used in a multiple beam array (MBA), or the size of a phased array antenna.

The instant invention also incorporates adaptive range-Doppler imaging for improved performance against volumetric clutter. For example if a collection of small objects such as soda pop cans were thrown from an overpass, most known radar systems would be fooled into predicting an impending collision. In contrast, the instant invention uses a combination of improved range resolution and range-Doppler imaging to resolve the clutter as a non-threat.

The instant invention provides variable dwell of the antenna to a specific location, thereby allowing Doppler to be collected to any desired resolution while providing automatic heightened scrutiny of regions that may contain a threat.

These and other objects, features, and advantages of the instant invention will be more fully understood after reading the following detailed description of the preferred embodiment with reference to the accompanying drawings.

BRIEF DESCRIPTION OF THE DRAWINGS

FIG. 1 illustrates one possible environment of the instant invention.

FIG. 2 illustrates examples of possible mounting locations of the instant invention on a vehicle.

FIG. 3 is a block diagram of the instant invention.

FIG. 9 is a block diagram of the operation of the host computer in accordance with the instant invention.

DETAILED DESCRIPTION OF THE PREFERRED EMBODIMENT(S)

Figure 4A:
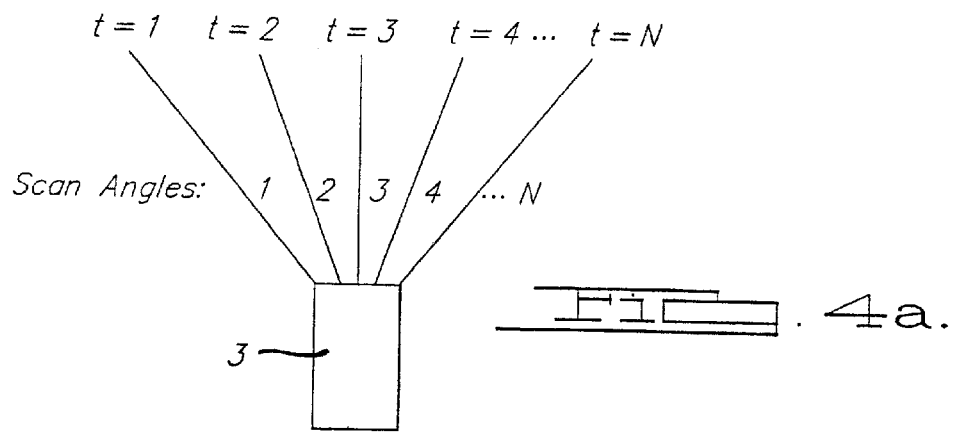
FIG. 4a illustrates a sequential scanning process in accordance with the instant invention.

Referring to FIG. 1 illustrating one example of an environment of a predictive collision sensing system, a host vehicle 3 is moving along a roadway (or may be stationary on the roadway). Along the roadway are a variety of stationary objects such as street signs, guardrails, overpasses, trees, parked cars, etc. In addition, there are other non-stationary objects such as pedestrians, bicycles, motorcycles, cars, trucks, and possibly trains operating on parallel or crossing tracks.

The host vehicle 3 moves through this complex scene, and the goal of the predictive collision sensing system of the instant invention is to determine which if any of the objects (stationary or moving) pose a threat to the host vehicle. The probability of threat and the type of threat is then computed and appropriate action must be performed, including but not limited to driver alerts, seat belt pre-tensioning, airbag readying and inflating, and braking. Threats to the host vehicle 3 may come from a multitude of directions, and may be of varying levels that may or mat not require activation of certain components within the active restraint system. For example, a different strategy is used for a bicycle colliding with the host vehicle 3 compared to a car colliding with the host vehicle 3.

The sensor aperture 12 of the predictive collision sensing system 10 of the instant invention is integrated into the exterior of a vehicle. The location of the sensor aperture 12 is based on providing an unobstructed view of the entire desired area of coverage. FIG. 2 shows examples of possible locations of the system: at the roof line over the windshield 12a, at the base of the windshield on the hood 12b, on the middle of the hood positioned like an air intake 12c, above each headlamp 12d, or located at each corner of the bumper 12e to provide the desired fill angular coverage.

The predictive collision sensing system 10 of the instant invention comprises the elements shown in FIG. 3. These elements include: sensor aperture 12, beam steering mechanism 14, sensor transmitter 36, sensor receiver 38, and a signal processor 30 comprising a sensor processor 33, host computer 34, and interfaces 35 which provide connection to the active restraint systems.

Figure 4B:
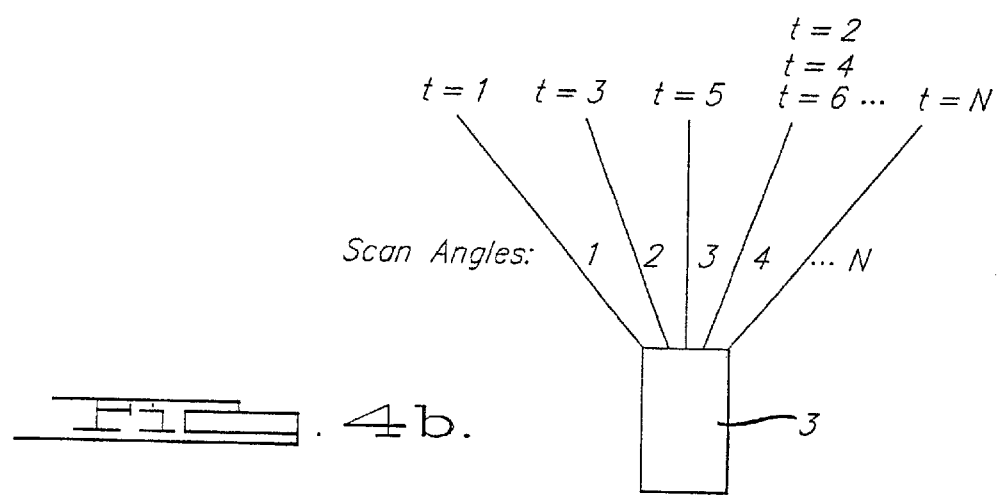
FIG. 4b illustrates an adaptive scanning process in accordance with the instant invention.

The sensor aperture 12 provides a "window" for the sensor to the outside environment. The transparency characteristics of the sensor aperture 12 depends on the wavelength of the electromagnetic signal to be used to sense the environment, such as IR, microwave, or millimeter wave RF signals. The sensor aperture 12 may also incorporate or comprise the system antenna in the case of systems using microwave or millimeter wave RF signals. The beam steering mechanism 14 allows the system to scan the entire field of interest (at least ±100 degrees) while maintaining a system that has very high angular accuracy. Furthermore, the beam steering mechanism 14 enables the beam of electromagnetic radiation to be positioned at approximately 10 degree intervals over the azimuthal scan range. More particularly, a multi-beam antenna would have from 14 to 30 distinct beam positions, preferably 21, covering the entire scan range. The beam steering mechanism 14 may be electronic (e.g. phased array or multi-beam antenna), electro-optical, or mechanical. The method of the instant invention supports either sequential repetitive scanning, as illustrated in FIG. 4a, or adaptive or random scanning where the antenna 12 can be quickly steered to a particular location while simultaneously scanning (i.e. interleave staring at one location with scanning) to allow more accurate analysis, e.g. longer dwell time for finer velocity resolution, of high threat targets as illustrated in FIG. 4b. The beam steering mechanism 14 is capable of scanning at least 20–40 Hz across the entire scan volume. In the adaptive or random scanning mode the system is designed to point to a particular direction within a few micro-seconds to reduce sensor dead time due to the effects of slew rate. While at each beam location, the sensor is capable of dwelling a variable amount of time depending on the desired target resolution and accuracy. For an RF sensor approach, the beam steering mechanism employs monopulse angular estimation based on sequentially pointing the antenna 12 at adjacent beam locations. For example if the sensor were directed to point to beam location 6 it would then point to 5 and/or 7 as well to provide better angular accuracy.

The sensor transmitter 36 converts an electronic command to transmit a signal into the actual propogated RF or electro-optical signal. The sensor transmitter 36 preferably is capable of encoding the signal to allow for precise range analysis as well as to prevent interference of the system from any other similar systems that may be in use in the same vicinity. In an RF implementation the preferred method is for the sensor to use a linear frequency modulated continuous wave (LFM-CW) waveform. This waveform provides detectability to within 1 meter of the vehicle, provides a minimum peak power transmitter and can be used to provide target speed. A pulsed RF system may also be used, but it requires very narrow pulses to support near range target detection. These narrow pulses then require very high peak power to provide detection at long range, or a more complex waveform that transmits a mixture of short and long time duration pulses for short and longer range operation. This feature of near range detection is important for the collision prediction system since the system must be able to maintain a track up to the moment of impact so as to provide accurate collision time estimates. For other automotive radar applications such as adaptive cruise control this near range detection is not essential since the system is designed to maintain a large minimum distance between another vehicle.

Figure 14:
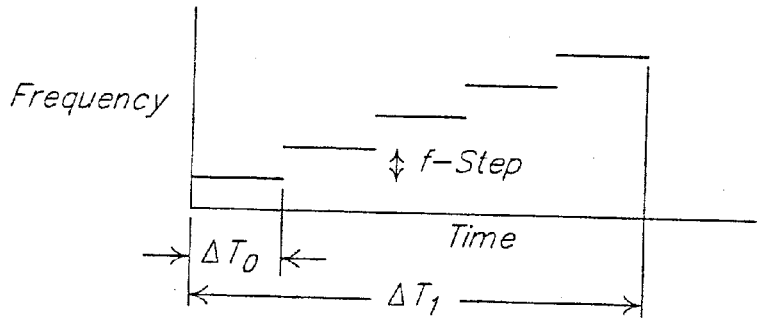
FIG. 14 illustrated a quantized LFM signal.

The preferred embodiment of the LFM waveform is to use a discrete stepped frequency approximation of the LFM as illustrated in FIG. 14. This implementation supports the use of low cost emerging Direct Digital Synthesizer technology which can very accurately generate specific frequencies. It also readily supports providing a unique set of frequencies for each vehicle to reduce the effects of inter-vehicle interference. The preferred embodiment of the transmitter subsystem for a RF implementation is to use an up-converting mixer architecture as show in FIG. 5 which generates the LFM signal at a lower frequency and then converts it to the transmitted frequency. This approach provides improved ability to carefully control the linearity of the LFM signal across a broad range of temperature and through the highly irregular prime power provided in an automobile. If an electro-optical sensor is used rather than an RF sensor, the preferred embodiment is to use the time of flight of a very narrow laser pulse.

The sensor receiver 38 re-converts the transmitted signal into an appropriate electrical signal for analysis by the signal processor. This includes any down-converting of the transmitted signal, demodulating any encoding used with the transmitted waveform, and generation of a baseband video signal for processing by the system processor. The preferred embodiment of the receiver for an electro-optical system is to use a photo-detection scheme that supports detection of the last returned pulse within a pre-defined time window. This allows the system to ignore very near range pulse returns due to debris on the sensor aperture 12 or returns due to fog and dust.

Figure 5:
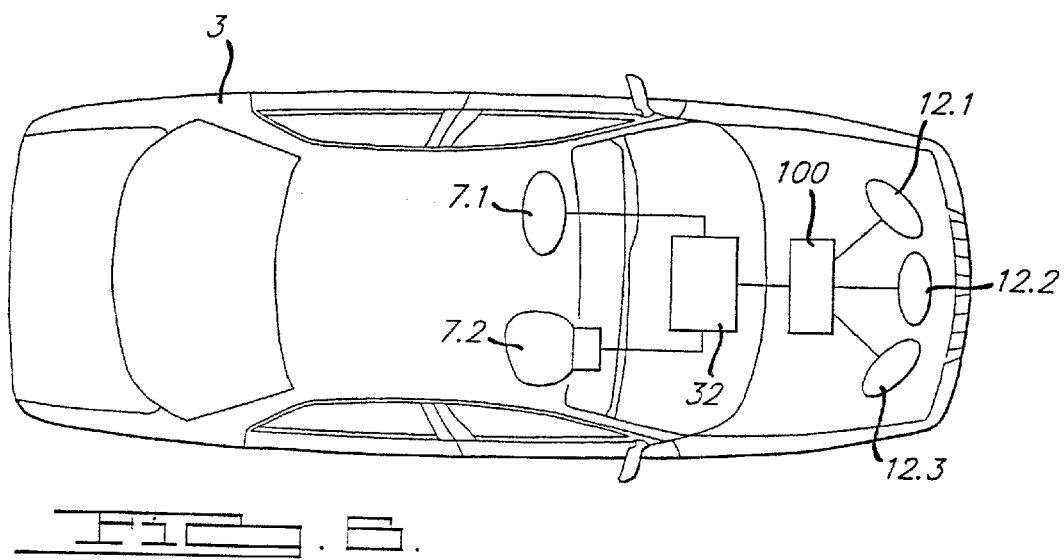
FIG. 5 is a block diagram of one aspect of an RF transmitter/receiver module in accordance with the instant invention.

More particularly for an RF system, referring to FIG. 5, a radar system 10 incorporates a direct digital synthesizer (DDS) 24 to synthesize a specific sequence of frequencies under the control of a signal processor 30. The direct digital synthesizer 24 varies the generated frequencies very quickly, for example by changing frequency within 40–100 nanosecond intervals. The direct digital synthesizer 24 may be developed from a single custom broadband device or from an off-the-shelf narrow band synthesizer with a comb filter network of offset frequencies which covers the entire desired frequency band, as is well understood by one having ordinary skill in the art. An intermediate frequency (IF) source 26 is mixed with the output of the direct digital synthesizer 24 by a mixer 18.3, and the output from the mixer 18.3 is further up-converted by mixing with the output from a direct reference oscillator (DRO) 20, or a Gunn diode, by a mixer 18.1 so as to produce an RF transmission signal having a frequency of approximately 47 GHz. The RF transmission signal passes through a circulator 16 into an antenna beam director 14 under control of the signal processor 30 which causes the signal to be transmitted by one or more of one or more antennas 12.1, 12.2, 12.3 so as to illuminate a region of interest proximate the vehicle 3. Either a plurality of fixed antennas 12.1, 12.2, 12.3, a single moveable antenna, or a phased array antenna may be incorporated without departing from the instant invention.

The transmitted signal is reflected from one or more either fixed or moving targets, and then received by the antenna system 12. The received signal is then directed by the circulator 16 to a mixer 18.2 which down-converts the signal by mixing with the output from a direct reference oscillator 20, and the down-converted signal is mixed with the output of the direct digital synthesizer 24 by a mixer 18.4 where it is further down converted so as to form a modulated IF radar signal. The modulated IF radar signal is phase shifted by a quadrature phase shifter 28, and both the modulated IF radar signal and the quadrature phase shifted version thereof are sampled by respective A/D converters 26.1, 26.2 so as to provide the signal processor 30 with a complex measure comprising the amplitude and phase $(A,\phi)$ of the modulated IF radar signal. The signal processor 30 detects the range and velocity of targets within the field of view of the radar system 10 and predicts whether or not a collision will occur, and if so, sends an appropriately time signal to control the activation of the safety restraint system 32 so as to mitigate injury to the occupant.

Figure 6:
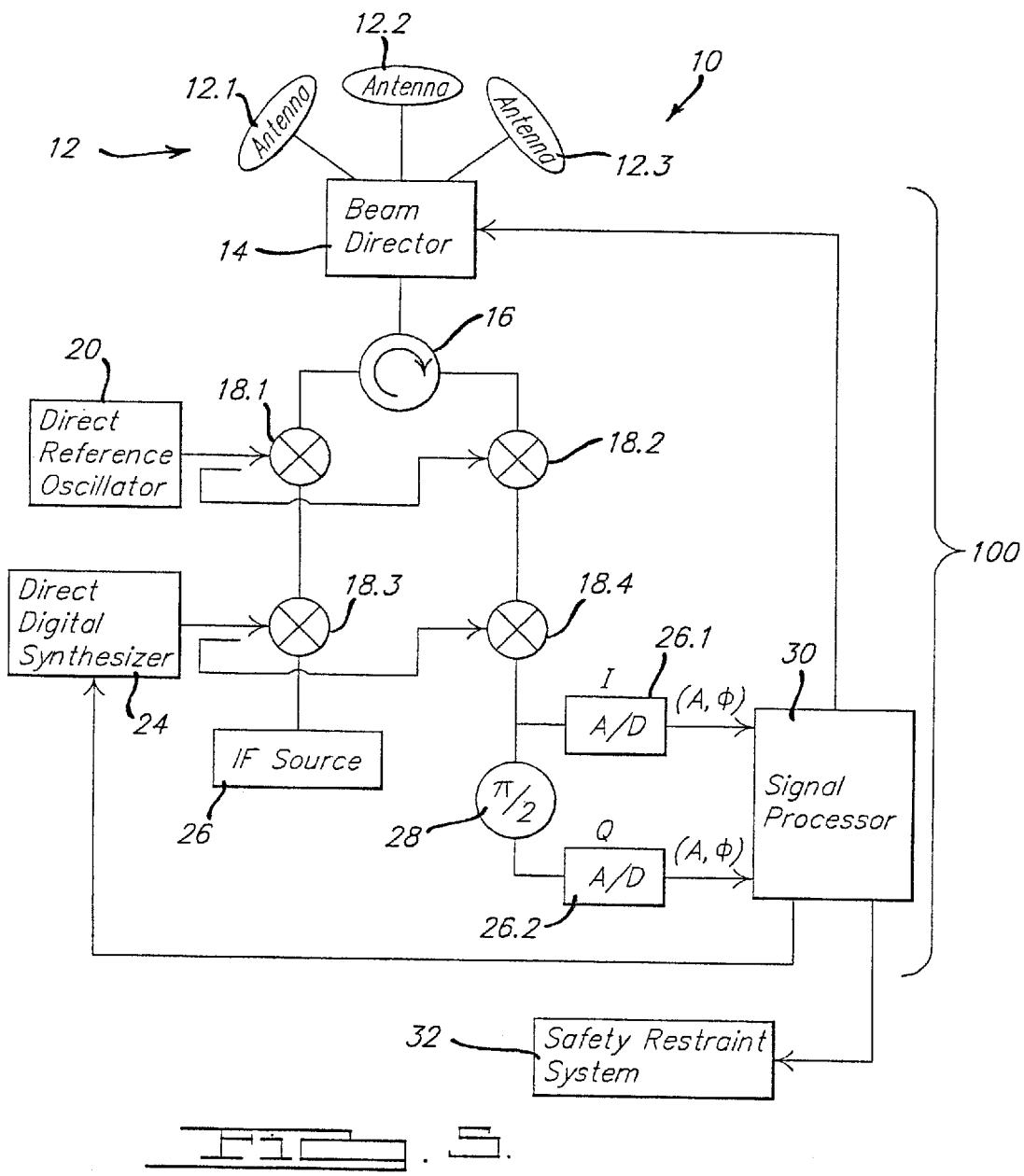
FIG. 6 illustrates the incorporation of the instant invention in a vehicle.

Referring to FIG. 6, the plurality of antennas 12.1, 12.2, 12.3 are mounted in the front of a vehicle 3 and are connected to a radar processor 100 which is further coupled to the safety restraint system 32, which for example activates frontal air bag systems 7.1, 7.2 responsive to a pending crash.

Figure 7:
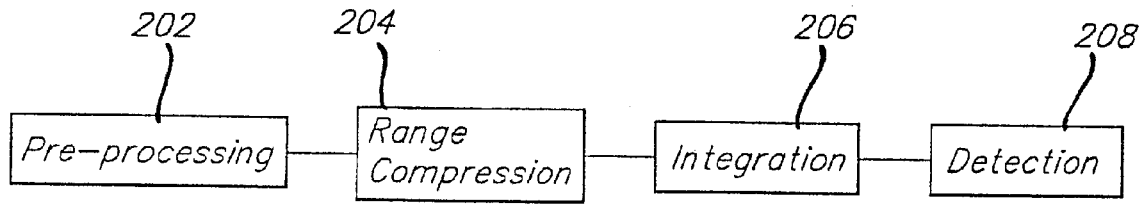
FIG. 7 illustrates a general block diagram of the processing steps in accordance with the instant invention.

The sensor processor 33 analyzes the incoming data and detects targets and false alarms. The sensor processor 33 includes suitable programming to compute the range, range rate, bearing, and amplitude of the target, and to transmit this data to the host computer along with a time tag, scan number, or current beam number for each sensor report. Note that this processing is only for the RF sensor implementation. For an electro-optical system, the sensor detector provides the targets range, angle, and amplitude directly to the host computer. The preferred embodiment of the RF sensor processing functional tasks is provided in FIG. 7. The processing involves the tasks of pre-processing (202), range compression (204), integration (206), and detection (208).

The pre-processing task (202) involves DC bias removal, I/Q (In-phase/Quadrature-phase) amplitude imbalance control, and leakage removal (in a LFM-CW implementation). The DC bias is to remove any constant amplitude offset in the incoming radar waveform, the I/Q imbalance control is to adjust for any variability between the In-phase and Quadrature detectors in the sensor receiver. The leakage removal is to remove any signal that is due to the finite efficiency of the aperture switches that direct the RF energy in the various beam directions. For the Collision Prediction System this removal is necessary since the leakage is typically larger than many targets and can result in near range targets being obscured by this energy. The preferred embodiment is to perform a dynamic leakage removal where the actual leakage is computed occasionally when no targets are present and stored to be used later to correct the incoming signals, as described in U.S. Pat. No. 5,969,667 referenced hereinabove.

The range compression task (204) has two distinct implementations, one if the RF sensor being used is pulsed, the other if it is CW. In a CW implementation, the range compression task performs frequency analysis on the incoming waveform using a Fast Fourier Transform (FFT) as the preferred embodiment. In the LFM_CW system a target's range is directly proportional to the frequency of its returned signal, therefore the FFT converts the radar signal into a target amplitude versus range plot. In a pulsed implementation this task is responsible for de-compressing the longer time duration pulses that are used for far range detection to allow the system to maintain constant range resolution and detection performance out to the sensor's maximum operating range. The preferred embodiment is to use a digitally encoded pulse for this to allow each vehicle to have its own coding to reduce the effects of interference. This is useful for these long range pulses since the probability of another car being within the host vehicle's operating range increases for the far range pulses compared to the near range pulses due to the increasing area covered by each vehicle's sensor as the range is increased.

The integration task (206) improves the signal-to-noise ratio of the target signal through further processor gain. Two exemplary embodiments of this task include either coherent or non-coherent integration of multiple instances of the processed amplitude versus range data. In the coherent mode, multiple snapshots of the range-amplitude data are Fast Fourier Transformed again for each range location to provide Doppler information for each range cell. This is the preferred embodiment since it allows the system to resolve stationary and moving targets that may occupy the same range cell, such as a car driving by a bridge abutment. In the non-coherent mode the multiple range-amplitude signals are filtered for each range cell using either a averaging or a rank order statistic filter. The rank-order statistic is preferred in situations where the sensor is prone to erroneous data due to power supply noise, etc. This mode is used if the radar is incapable of maintaining coherency across multiple LFM ramps or pulse groupings.

Figure 12:
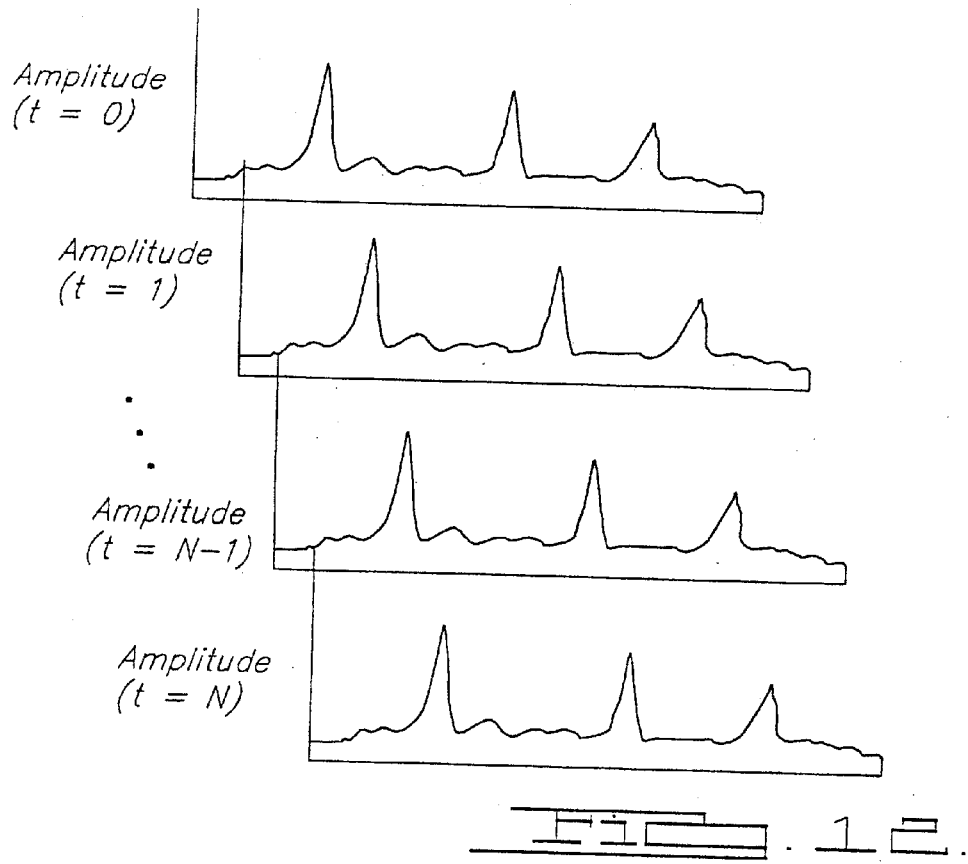
FIG. 12 illustrates the amplitude of the radar return signal for an environment with 4 objects at three different ranges, wherein two of the objects are at the same range but have differing velocities relative to the host vehicle.
Figure 13:
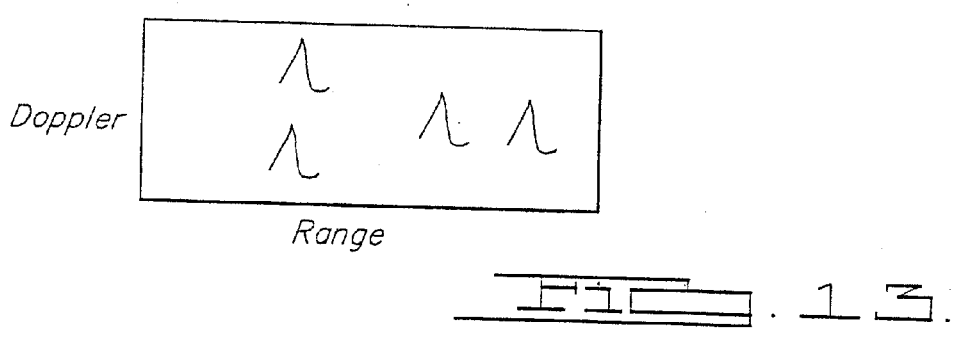
FIG. 13 illustrates the range/Doppler map of the objects in accordance with FIG. 12.

Referring to FIG. 12, the predictive collision sensing system 10 generates a series of range-amplitude profiles from conventional LFM stepped frequency processing at each beam location. These range profiles are then sequentially processed by generating a Fast Fourier Transform (FFT) of the time series that corresponds to every range cell out to the maximum range of the system. The result is a range-Doppler image for a given beam location as shown in FIG. 13. As illustrated in the example shown in FIG. 12, the range profiles indicate that there are three targets detected in front of the vehicle, however, the range-Doppler image of FIG. 13 indicates there are actually four targets, and that two of them are at the same range. The Doppler processing allows for detection of multiple targets each at a different speed (or possibly at a different location in a azimuth angle within the beam).

Thus the benefit such an arrangement provides for the automotive radar system is that if a mall vehicle, for example if a slow moving motorcycle were in front of the host vehicle and a truck were in the next lane moving at a different speed than the motorcycle, the host car would not see the motorcycle which could result in an undetected collision. The system of the instant invention with Doppler processing would detect the motorcycle. Another example of the benefits of Doppler processing is the situation where the host car is in a tunnel or under a bridge overpass, with another vehicle in front of the host car and moving more slowly, where without Doppler processing the radar might not see the target car because of the interference from the tunnel/bridge structure, but with Doppler processing, the car can be detected.

Figure 11:
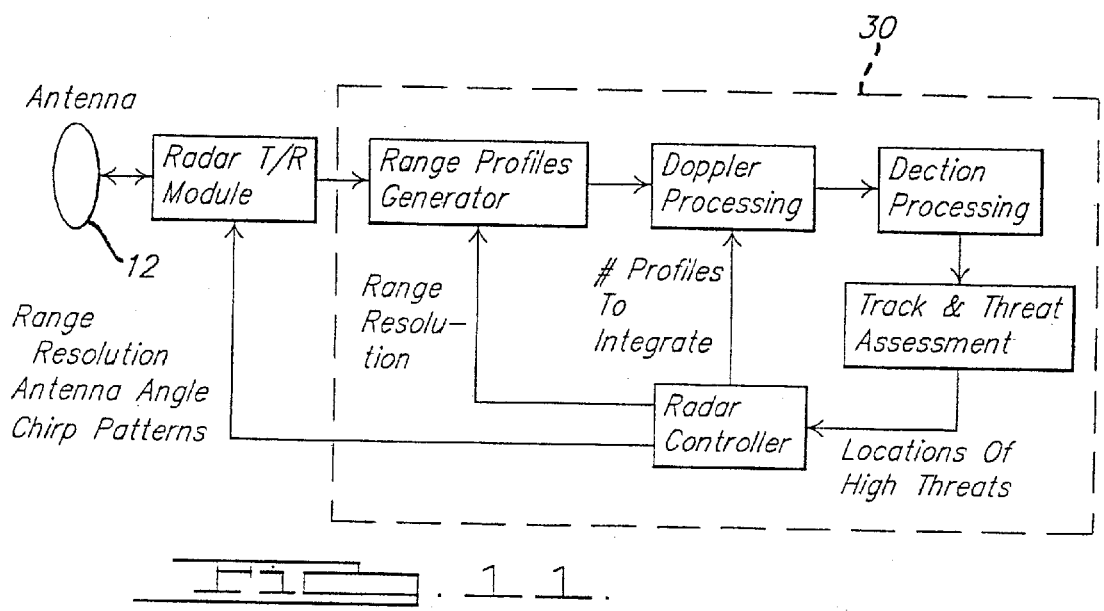
FIG. 11 illustrates a block diagram of the instant invention.

Another unique feature that is important for the automotive radar application of Doppler is that the integration time, or the number of range profiles that are integrated with the FFT (Doppler) processing, is variable and dependent upon the threat processing logic as seen in FIG. 11. For example, if a target is detected in front of the vehicle and it is desired to determine if there are actually multiple targets at the same range, the radar controller would direct the antenna to remain at that location and a longer set of range profiles would be collected. This longer set would provide improved resolvability of the Doppler of the targets.

For example, if the radar were to look at a given location for only 3.7 milliseconds for a 46 GHz radar, the system could resolve targets spaced only 1.9 miles per hour apart in speed, whereas for a 37 millisecond integration, the system would have a detection resolution of 0.2 mph. For higher frequency radars, this time becomes even shorter for the same resolution. This is sufficient resolution to separate two targets that are in adjacent highway lanes at 50 meters distance, and would enable the host vehicle to separate a motorcycle from an adjacent truck, while still using a wider antenna beam. In order to obtain higher resolution at a particular location, the radar system is commanded by the Radar Controller to skip one scan of the radar and instead focus on a single high interest beam location. The controller then manages the number of times this occurs to prevent the total search space from being under-sampled and risking an undetected collision.

The system of the instant invention is ideal for the collision prediction problem where a large area must be scanned by the antenna (e.g.>180 degrees). If a very narrow beamwidth were used, the system would not be able to dwell at any location long, and would not be able to measure accurate Doppler from the targets in order to achieve angular resolvability, thereby limiting the system's ability to accurately estimate time to impact. The instant invention provides an accurate measure of the Doppler of the targets for estimating time to collisions, and also provides a means for resolving closely spaced targets in angle so as to allow the system to more robustly detect potential collision events.

The system of the instant invention also manages the range resolution of the system, to allow the radar to generate a very high range resolution for a given beam angle if for example, the system was to verify the type of target by the range profile thereof (e.g. is it a car or only a street sign).

The detection task (208) performs constant-false-alarm rate (CFAR) processing on each range cell by comparing the signal from the cell to the surrounding background signals. The preferred embodiment of the CFAR is an order statistic CFAR where the amplitude of each range location is compared the N'th cell of an amplitude sorted window around that range cell. This provides excellent closely spaced target detections, such as of two nearby cars, which is important for a predictive collision sensing system.

Figure 8:
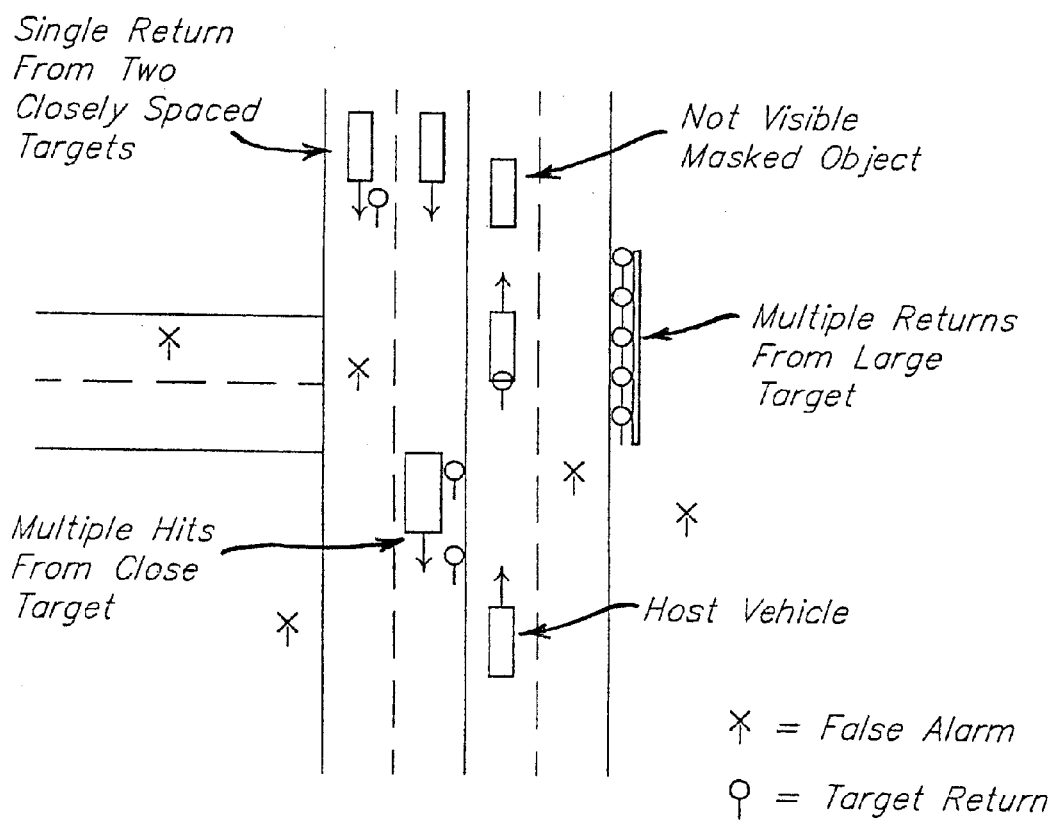
FIG. 8 illustrates the radar return signals for one possible environment of the instant invention.
Figure 5:
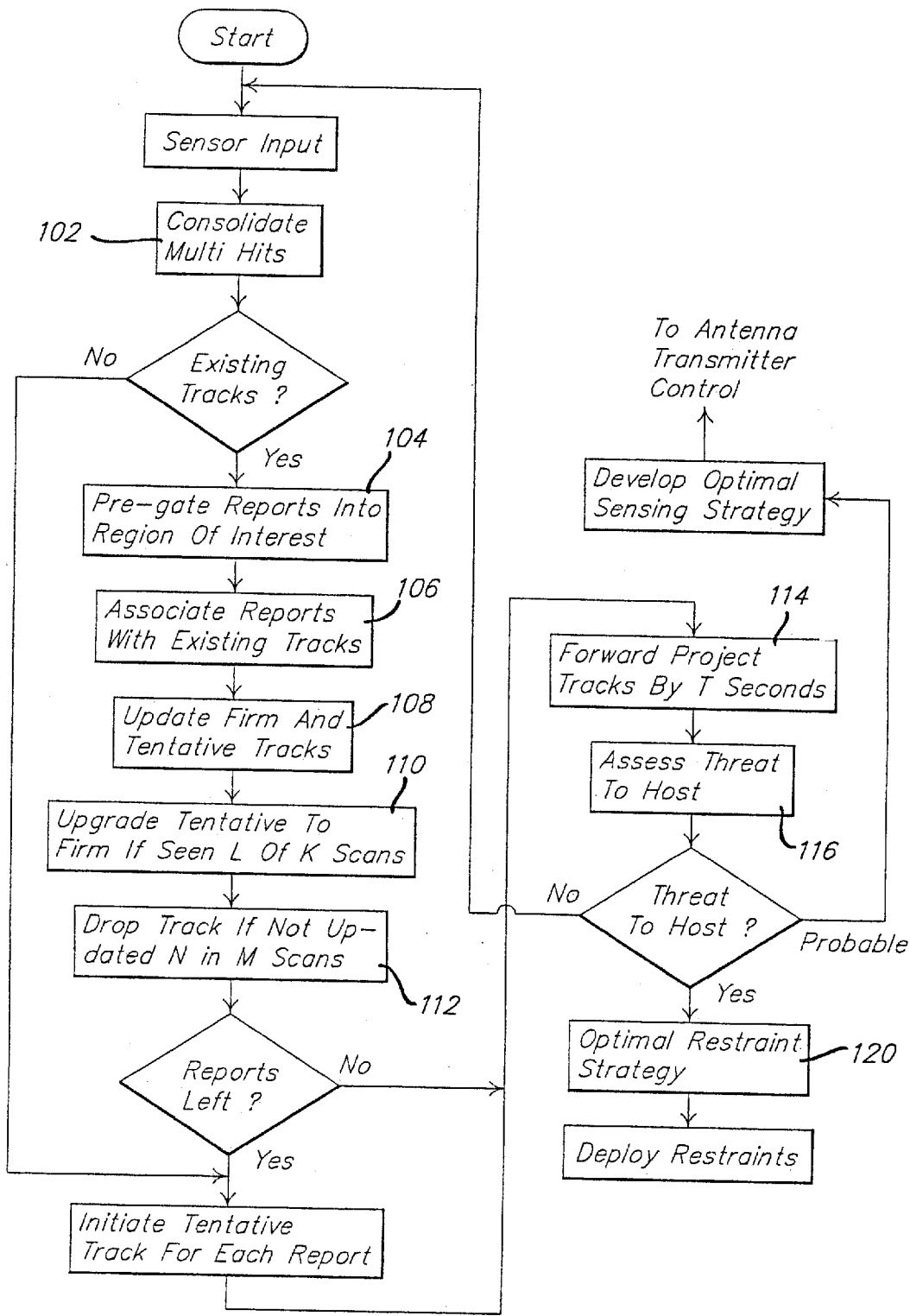

A traffic "scene," such as represented in FIG. 8, is generally composed of a plurality of sensor reports. The host computer 34 is responsible for executing the primary predictive collision sensing system algorithms. The host computer receives the sensor reports which include actual sensor reports; as well as sensor reports from stationary objects such as buildings, trees, roadway signs, etc;. and false sensor reports due to the various noise sources in the sensor receiver, (also sometimes a lack of sensor reports or missed sensor reports since a target may be near the system detection capability due to its size or scattering characteristics). The overall operation of the host computer 34 with respect to these inputs is shown in the flow chart of FIG. 9.

The primary function of the host computer 34 is to develop tracks on each of the possible targets that the predictive collision sensor detects. A track is defined as a smoothed state vector corresponding to the sensor reports. The preferred embodiment of the tracker is to use a multiple state Cartesian coordinate tracking algorithm based on the Kalman filter. The Cartesian coordinate system is used since the tracks for the targets (cars, etc) are linear in this space, as opposed to the range-angle (polar) sensor coordinates. In polar coordinates, passing targets exhibit very non-linear dynamics such as radical accelerations in bearing as the target passes the host vehicle at close range. In the preferred embodiment the tracker maintains position, velocity, and acceleration information on each target in the x-y coordinate system. In addition, the track state vector maintains a measure of the target extent or size which is a key element in estimating crash severity. These states are all required in the down-stream collision estimation processing to determine the point of closest approach (and consequently collision likelihood) of the target vehicle with the host vehicle.

The host computer 34 maintains two types of tracks: firm and tentative. Firm tracks are tracks that have been "seen" by the sensor processor 33 and are of sufficient quality, as characterized for example by being updated with sensor reports for M of the last N scans, by a moving window average of the Kalnan residuals, or by some other possible metric. The track residual is defined as the difference between the expected location of the target track and the actual sensor report location that was used to update that track. Tentative tracks are all tracks that have a reduced quality as characterized for example by only having been seen less than M times within the last N scans. The system presumes that all sensor reports are possible tracks until proven otherwise, in order to significantly lessen the possibility of missing an object. Tentative tracks are analyzed for threat potential in the same manner as the established tracks since lower track quality may result from scene dependent effects, such as temporary obscuration of a threat vehicle by another non-threatening vehicle.

Figure 10:
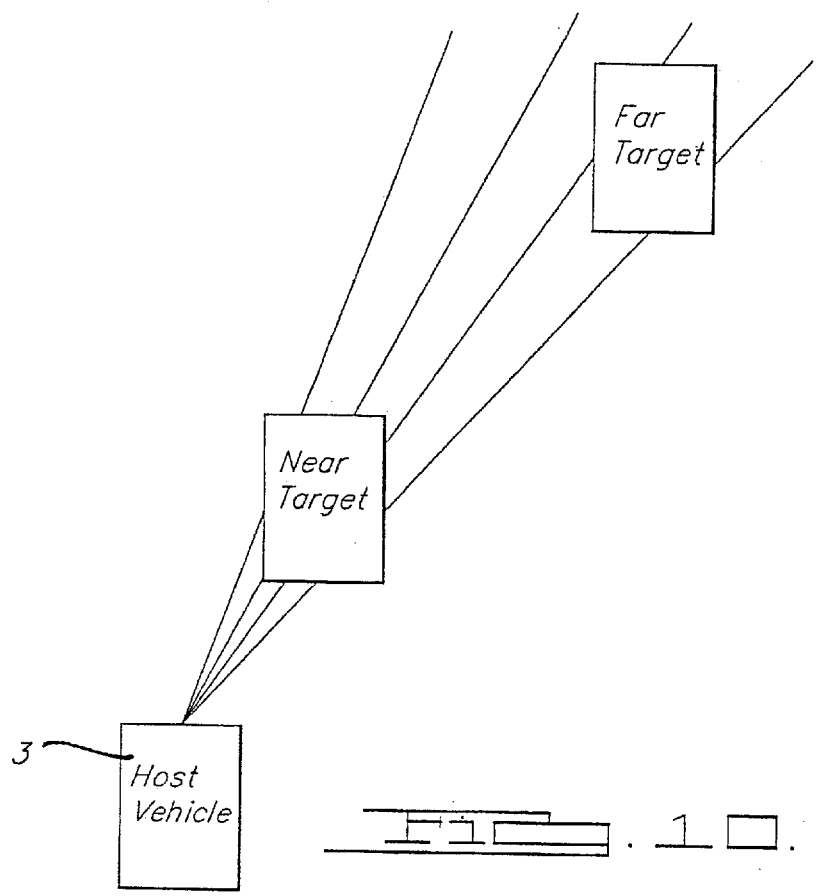
FIG. 10 illustrates the improvement in cross-range resolution with decreasing distance to the target, and further illustrates how range measurements from adjacent scan locations can be combined via clustering so as to estimate the size of a given target.

Referring to FIG. 9, the host computer 34 receives the sensor reports from the sensor processor 33 and immediately consolidates (102) sensor reports that correspond to the same target. A clustering algorithm is performed to reduce the multiple sensor reports from single large objects, (e.g. sides of trucks, guardrails, buildings) etc. to reduce the number of objects tracked and to logically group and track complete objects rather than portions of objects, as illustrated in FIG. 10 for near and far targets. This clustering is based on the range, angle, and speed of the sets of possible target returns, based on a normalized 'distance' function, such as but not limited to the weighted Euclidean distance and a k-means clustering algorithm:

$$\text{distance} = \text{sqrt}((\text{distance in range/range variance of sensor})^2 + (\text{distance in cross-range/cross-rangevariance of sensor})^2 + (\text{distance in speed/speed variance of sensor})).$$

This allows the system to separately track cars near bridges and other stationary objects. In addition to determining the centroid of the cluster of sensor reports that are from the same target, the algorithm also computes the cross-range extent of the target. This value is also included in the tracking system parameters, and a smoothed estimate of this value is computed with each additional sensor input. Targets such as automobiles at far range will not have an accurate estimate due to the limitations in the sensor angular accuracy, however, as the target range decreases, the target subtends multiple beams and a more accurate estimate is possible. The extent of a target is computed using a weighted combination of the total computed extent for each antenna scan, as well as a temporal analysis of the random variation of the cross range sensor report estimate since part of the variation in a target's angular position is due to glint effects (random scattering locations on the target). This is accomplished by augmenting the Kalman filter with a state to track the size of the target. The size state is updated and predicted based on its value and the distance to the target (the x and y states) since as the target moves closer it should grow larger. This allows the system to detect the difference between relatively small objects—such as street signs, or bicycles—and vehicles or other large massive and potentially dangerous objects.

The host computer 34 then pre-gates (104) the sensor reports in preparation for their association with the tracks by logically grouping sets of sensor reports that are closely spaced (in range, range rate and bearing), and only associating them with tracks that are also similarly closely spaced. This effectively divides the entire search space into regions of interest. This also significantly reduces the later processing requirements of the system in the subsequent sensor report-to-track association. The host computer 34 then associates (106) the sensor reports to tracks. First the firm (or established) tracks are associated using the sensor report list, and then the remaining sensor reports are associated with the tentative tracks. The association may be performed using a global optimization algorithm to minimize the total distance between all of the sensor reports and all of the tracks or probabilistic methods where all nearby sensor reports are assumed to contribute to the track update based on their relative distance from the projected track location. This relative distance between tracks and sensor reports is used to determine the relative contribution of each sensor report to each track.

Once the associations are complete, the tracks are updated (108) using this new sensor report data. Tracks that are not updated with new data are "dead reckoned" by advancing their expected position on the next scan using the assumed vehicle motion model. Tentative tracks that had been updated with sensor report data and are of high quality (i.e. updated M of the last N scans, moving average of track residuals, or other quality measures) are then advanced to a status of firm (110), while both firm and tentative tracks that are not of sufficient quality (i.e. have not been positively updated at least K of the last N scans) are removed from the lists (112). This allows objects that have been passed by the host vehicle and are no longer within the field of view of the sensor to be dropped since they are no longer of interest to the system. The use of a quality metric strategy for updating and dropping allows the system to handle missed sensor reports due to either random target signal fluctuations or due to masking of the tracked vehicle by other objects for a short period of time.

Once the tracks have been completely updated, they are projected forward in time (114) for each of a plurality of time delays. These delays correspond to the amount of time required to deploy each of the corresponding safety restraint systems and devices in the vehicle 3. The threat of each track is then assessed (116) using a point of probable closest approach analysis, whereby assigned levels of threat are based on the targets location within a series of concentric ellipses, with the closest ellipse, being the highest threat. A probability of threat is assigned to the intruding object based on the accuracy of the track, its state (tentative or firm), and the quality of the track (i.e. time of last active update and the total number of updates over the time interval the target was in the sensor field of view, or other metrics). For each track, the track state values, the associated quality metric and the associated covariance matrix from the Kalman filter are used to provide a confidence measure as to the region where the target vehicle is most likely to actually be located at some future time T, and the amount of overlap between this ellipse and the host vehicle's location. Location error ellipses are computed for a plurality of times rather than a single time. These time intervals are determined by the reaction time and the intrusiveness of the various active safety devices. The error ellipse for each time projection, the threat object speed, and threat object size are all provided to the optimal restraint strategy processing algorithm (120). The combination of restraint devices is selected based on these parameters. The strategy analysis provides trigger commands which will consist of times to initiate, deployment rates, and deployment amounts for variable rate air bag inflation, seat belt tensioning, and other possible devices. For example, one possible hierarchy of active devices is:

1. audible driver warning
2. seat belt pre-tensioning
3. vehicle braking
4. external airbag deployment
5. internal airbag deployment Note that the forward projection of the track in time is dependent on the time response and intrusiveness. For example it takes much longer for a driver to react to an audible warning than for the airbag to deploy, so the track is projected possibly 2 seconds forward for warning and 200 milliseconds for the airbag. Likewise the audible warning is less intrusive so a false warning is not as critical as a false airbag deployment. This parallelism between restraint intrusiveness and deployment time is advantageous since the farther forward in time the track is projected the greater the error in the location estimates. Therefore the greater the intrusiveness of the system the inherently more accurate the target vehicle location, and the lower the likelihood of a false alarm.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A predictive collision sensing system for a vehicle, comprising:

a. a radar transmitter/receiver module for illuminating a zone proximate the vehicle with a beam of electromagnetic energy and for receiving portions of said beam of electromagnetic energy reflected by one or more objects illuminated by said electromagnetic energy thereby providing an estimate of the distance to said target relative to the vehicle;

b. a signal processor operatively coupled to said radar transmitter/receiver module;

c. a means under control of said signal processor for scanning said beam of electromagnetic energy over an azimuth range in accordance with an azimuth coverage pattern, wherein said azimuth coverage pattern is continuous;

d. a target tracking algorithm implemented by said signal processor for tracking said one or more objects relative to the vehicle;

e. a clustering algorithm implemented by said signal processor for grouping separate tracks of said one or more objects;

f. a target size estimating algorithm implemented by said signal processor for estimating the azimuthal extent of said one or more objects tracked by said target tracking algorithm; and g. a threat assessment algorithm implemented by said signal processor for assessing the threat of said one or more objects to the vehicle, whereby said signal processor controls one or more vehicular devices responsive to said assessment of threat, so as to enhance the safety of the occupant of the vehicle.

2. A predictive collision sensing system for a vehicle as recited in claim 1, wherein said radar transmitter/receiver module further provides an estimate of the velocity relative to the vehicle for each of said one or more objects.

3. A predictive collision sensing system for a vehicle as recited in claim 1, wherein said radar transmitter/receiver module incorporates an antenna having a plurality of distinct beam positions.

4. A predictive collision sensing system for a vehicle as recited in claim 3, wherein said radar transmitter/receiver module incorporates a multi-beam antenna.

5. A predictive collision sensing system for a vehicle as recited in claim 1, wherein the range of azimuth angles associated with said azimuth coverage pattern is at least +/−100 degrees relative to the front of the vehicle.

6. A predictive collision sensing system for a vehicle as recited in claim 1, wherein the size of said beam of electromagnetic energy is approximately 10 degrees.

7. A predictive collision sensing system for a vehicle as recited in claim 1, wherein said beam of electromagnetic energy is sequentially scanned over said azimuth coverage pattern if said target tracking algorithm is not tracking an object, and said beam of electromagnetic energy is adaptively scanned responsive to the path of said one or more objects when target tracking algorithm is tracking said one or more objects.

8. A predictive collision sensing system for a vehicle as recited in claim 1, wherein the trajectory of said one or more objects is tracked in Cartesian coordinates relative to the vehicle.

9. A predictive collision sensing system for a vehicle as recited in claim 1, wherein said target tracking algorithm incorporates a Kalman filter.

10. A predictive collision sensing system for a vehicle as recited in claim 9, wherein said Kalman filter is augmented with a state to track the target size.

11. A predictive collision sensing system for a vehicle as recited in claim 1, wherein said one or more vehicular devices are selected from the group consisting of one or more warning devices, the vehicle braking system, the vehicle steering system, and one or more occupant restraint devices.

12. A predictive collision sensing system for a vehicle as recited in claim 11, wherein said radar transmitter/receiver module operates in the pulsed mode.

13. A predictive collision sensing system for a vehicle as recited in claim 12, wherein said linear frequency modulated continuous wave mode incorporates a quantized waveform.

14. A predictive collision sensing system for a vehicle as recited in claim 11, wherein said radar transmitter/receiver module operates in the linear frequency modulated continuous wave mode.

15. A predictive collision sensing system for a vehicle as recited in claim 1, wherein said electromagnetic energy comprises energy selected from group consisting of RF energy, microwave energy, and millimeter wave energy.

16. A predictive collision sensing system for a vehicle as recited in claim 1, wherein said electromagnetic energy comprises optical energy.

17. A predictive collision sensing system for a vehicle as recited in claim 1, wherein said clustering algorithm is responsive to range, cross-range, and speed in accordance with a normalized distance function.

18. A method of predicting a crash for a vehicle and for controlling one or more vehicular devices responsive thereto, comprising:
   a. measuring the range of one or more objects relative to the vehicle using an azimuthally scanned radar beam;
   b. calculating the trajectory of said one or more objects from said range measurements;
   c. clustering separate tracks of said one or more objects;
   d. measuring the azimuthal extent of said one or more objects from said range measurements and from the azimuthal scan angle of said radar beam;
   e. assessing the threat of said one or more objects to the vehicle from a combination of said trajectory and said azimuthal extent of said one or more objects; and
   f. controlling one or more vehicular devices responsive to said assessment of threat, so as to enhance the safety of the occupant of the vehicle.

19. A method of predicting a crash for a vehicle and for controlling one or more vehicular devices responsive thereto as recited in claim 18, further comprising the operation of radar sensing the velocity of one or more objects relative to the vehicle using a scanned radar beam.

20. A method of predicting a crash for a vehicle and for controlling one or more vehicular devices responsive thereto as recited in claim 18, wherein the scanning of said scanned radar beam is responsive to said threat assessment of said one or more objects to the vehicle.

21. A method of predicting a crash for a vehicle and for controlling one or more vehicular devices responsive thereto as recited in claim 18, wherein said trajectory of said one or more objects is calculated in Cartesian coordinates by Kalman filtering.

22. A method of predicting a crash for a vehicle and for controlling one or more vehicular devices responsive thereto as recited in claim 18, wherein said aziumuthal extent of said one or more objects is estimated by clustering analysis.

23. A method of predicting a crash for a vehicle and for controlling one or more vehicular devices responsive thereto as recited in claim 18, wherein said threat assessment incorporates an estimate of crash severity.

24. A method of predicting a crash for a vehicle and for controlling one or more vehicular devices responsive thereto as recited in claim 18, said threat assessment incorporates an estimate of crash time.

25. A method of predicting a crash for a vehicle and for controlling one or more vehicular devices responsive thereto as recited in claim 18, said threat assessment incorporates an estimate of crash direction.

26. A method of predicting a crash for a vehicle and for controlling one or more vehicular devices responsive thereto as recited in claim 18, said threat assessment incorporates an estimate of crash probability.

27. A method of predicting a crash for a vehicle and for controlling one or more vehicular devices responsive thereto as recited in claim 18, wherein said one or more vehicular devices are selected from the group consisting of one or more warning devices, the vehicle braking system, the vehicle steering system, and one or more occupant restraint devices.

28. A method of predicting a crash for a vehicle and for controlling one or more vehicular devices responsive thereto as recited in claim 18, wherein the clustering of said separate tracks of said one or more objects comprises the step of calculating a normalized distance function that is responsive to range, range variance, cross-range, cross-range variance, speed, and speed variance.

29. A method of predicting a crash for a vehicle and for controlling one or more vehicular devices responsive thereto as recited in claim 18, wherein said Kalman filter is augmented with a state to track target size.

30. A method of predicting a crash for a vehicle and for controlling one or more vehicular devices responsive thereto, comprising:
   a. measuring the range of one or more objects relative to the vehicle using an azimuthally scanned radar beam;
   b. measuring the velocity of one or more objects relative to the vehicle using said azimuthally scanned radar beam, wherein the operations of measuring the range and velocity of one or more objects relative to the vehicle using said azimuthally scanned radar beam comprises:
      i. generating a continuous wave RF signal comprising a repetitive sequence of uniformly spaced frequencies so as to form a transmitted signal;
      ii. illuminating the object with said continuous wave RF signal;
      iii. receiving the component of said RF signal reflected by said one or more objects so as to form a received signal;
      iv. mixing said received signal with said transmitted signal so as to form a complex amplitude frequency difference signal from the difference in frequency therebetween;

v. comparing the real part of said complex frequency difference signal with a plurality of monotonically increasing threshold values, wherein adjacent threshold values corresponds to the bounds of an associated range cell, vi. storing the complex amplitudes of said received signal for each said associated range cell so as to form an associated list of complex amplitudes;

vii. calculating the Doppler shift for each said associated range cell from a spectral analysis of said associated list of complex amplitudes; and viii. collecting said Doppler shift calculations for all said associated range cells so as to form a range-Doppler map for said one or more objects, thereby providing the distance and velocity of said one or more objects relative to the vehicle;

c. calculating the trajectory of said one or more objects from said range measurements;

d. clustering separate tracks of said one or more objects;

e. measuring the azimuthal extent of said one or more objects from said range measurements and from the azimuthal scan angle of said radar beam;

f. assessing the threat of said one or more objects to the vehicle from a combination of said trajectory and said azimuthal extent of said one or more objects; and g. controlling one or more vehicular devices responsive to said assessment of threat, so as to enhance the safety of the occupant of the vehicle.

* * * * *